April 19, 1932.  C. WOLF  1,854,637

TROUGH SHAPED BELT CONVEYER

Filed April 11, 1927  3 Sheets-Sheet 1

Inventor
Christian Wolf
By Edward C. Sarnett

April 19, 1932.  C. WOLF  1,854,637
TROUGH SHAPED BELT CONVEYER
Filed April 11, 1927  3 Sheets-Sheet 2

Inventor
Christian Wolf
By Edward C. Saeutt
Atty.

April 19, 1932. C. WOLF 1,854,637
TROUGH SHAPED BELT CONVEYER
Filed April 11, 1927 3 Sheets-Sheet 3
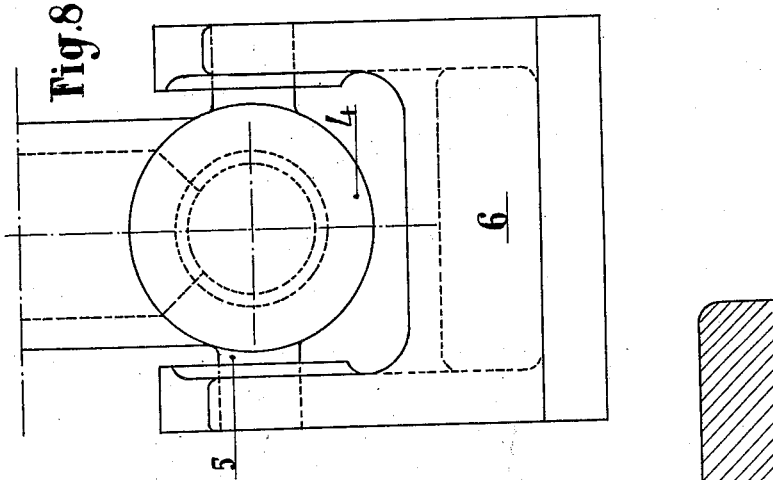
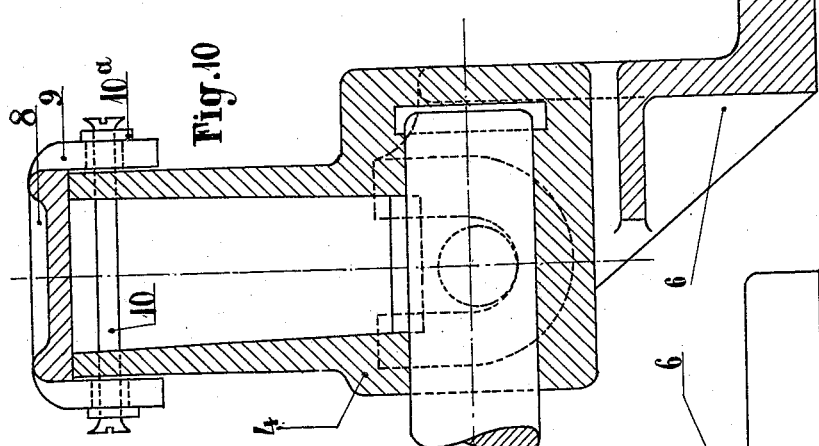
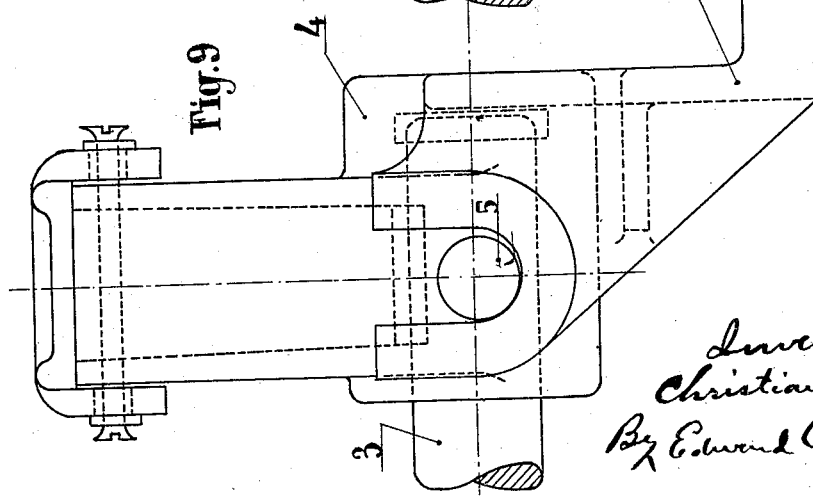
Inventor
Christian Wolf
By Edward C. Sarrett
Atty.

Patented Apr. 19, 1932

1,854,637

UNITED STATES PATENT OFFICE

CHRISTIAN WOLF, OF LE PERREUX, FRANCE, ASSIGNOR TO PRÉPARATION INDUSTRIELLE DES COMBUSTIBLES (SOCIÉTÉ ANONYME), OF NOGENT-SUR-MARNE, FRANCE

TROUGH-SHAPED BELT CONVEYER

Application filed April 11, 1927, Serial No. 182,887, and in France April 12, 1926.

The majority of trough-shaped conveyers in use comprise idle rollers rotating on fixed axles. These rollers are lubricated generally by lubricators in which the axles are hollow to permit the lubricant to reach the rollers.

This prior construction has the following disadvantages:

The lubricators should act regularly, which requires a considerable degree of watchfulness on the part of the operators. The result is that the rollers are often badly lubricated, do not rotate freely thus causing increased wear of the belt due to sliding friction. Moreover, if the lubricant flows too freely through the lubricating holes in the first roller that it meets in traversing the shaft of the tube, all the lubricant will be consumed at this first roller, leaving the remaining rollers unlubricated. Thus, the lubricant is badly distributed and the lubricators require frequent filling, which involves considerable manual labor and use of lubricant.

Conveyers of the above-mentioned type have also been made with rollers mounted on two axles lubricated with grease. This arrangement has certain advantages but the existing devices have the following disadvantages:

It is necessary completely to dismount the conveyer in order to fill the grease boxes or to ascertain if they are sufficiently filled, which is troublesome and time-consuming, and renders it difficult to inspect the grease boxes. Moreover, the inclined rollers are arranged in such manner that their surfaces which rest on the supports are not evenly lubricated.

The object of the present invention is to improve the lubrication of trough-shaped conveyers by eliminating the disadvantages pointed out above in the prior art constructions.

The improvements are illustrated by the annexed drawings, of which:

Figs. 8, 9 and 10 show on an enlarged scale the grease boxes and their mounting.

Figure 1:
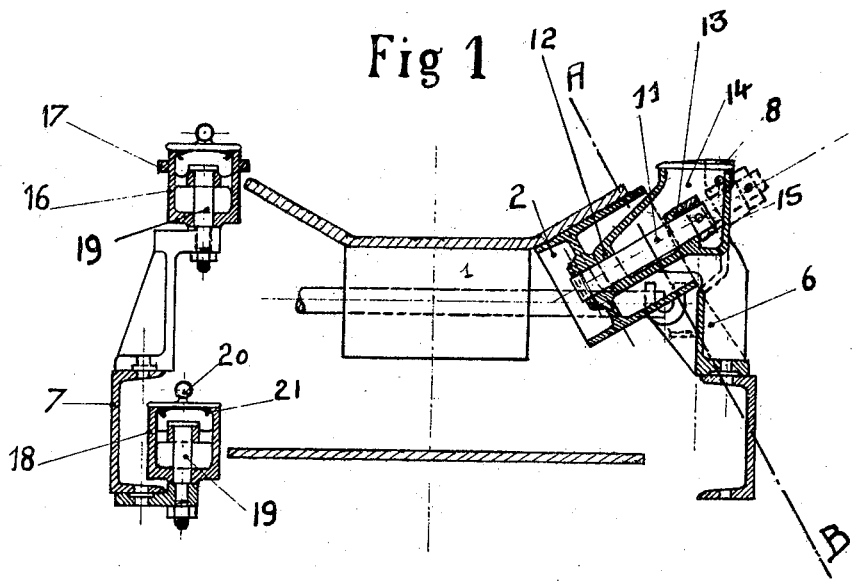
Fig. 1 is a cross section of a conveyer having the present improvements applied thereto.
Figure 4:
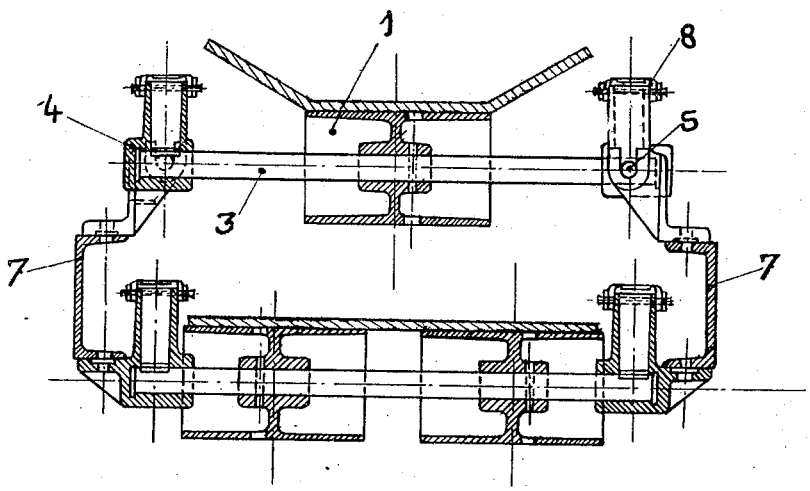
Fig. 4 is a cross section through the horizontal support rollers.
Figure 2:
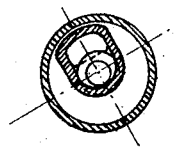
Fig. 2 is a section through an elevator roller of the conveyer on the line A—B of Fig. 1.
Figure 3:
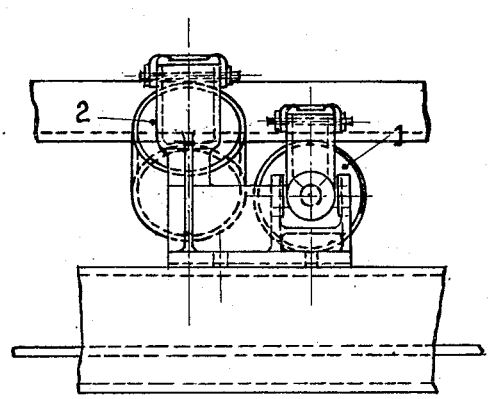
Fig. 3 is a side view of the support for the roller which carries the upper run of belting.
Figure 5:
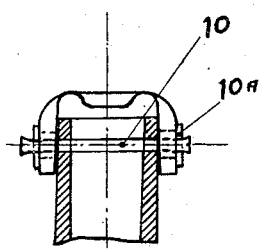
Figs. 5, 6 and 7 are detail views of the grease box covers.
Figure 6:
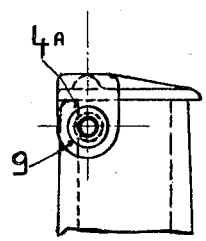
Figure 7:
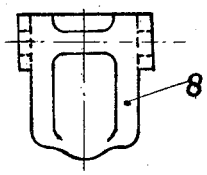

The upper run, or load supporting portion, of the belt is supported at certain distances by a group of three rollers, viz. a horizontal roller 1 and two inclined rollers 2. These rollers are not in the same transverse plane, which lessens the strain on the belt at the bending point, as experience has shown. Roller 1 is formed of any suitable material, as iron, wood, etc. and is suitably secured to shaft 3 which rotates in two bearings lubricated by grease. These bearings are mounted by means of trunnions 5 in forks formed in the support 6. This Cardan mounting allows a considerable length of shaft to be carried by the supports and reduces friction, even though the flanges of the channel bar 7, which form the frame of the apparatus, are not in the same plane and become displaced after adjustment. The bore for the axle of the horizontal roller could be formed directly in the support 6, but the advantage of the Cardan mounting of the bearings 4 would not then be obtained.

Each of the grease boxes is adapted to be closed by a cover 8 having depending ears 9 having two lugs formed with holes through which passes a shaft 10 supported in apertures drilled in the grease box. The holes in lugs or ears 9 are considerably larger than the diameter of shaft 10, the latter being riveted at each end to a washer 10$^a$ larger than the holes in ears 9. This construction permits the cover to be turned up over the rounded edge 4$^a$ of the grease box.

Each elevator roller 2 is mounted on a shaft 11, which rotates in two bearings 12 and 13, provided with oil grooves, in the grease box 14 carried by the support 6. Shaft 11 at the opposite end to that on which the roller is mounted carries an abutment ring 15 held in place by any suitable means, e. g. a pin. The bearings in which shaft 11 rotates are thus effectively lubricated, and moreover the bearing surface of ring 15 on the surface of bearing 13 is also effectively lubricated. Grease box 14 is provided with a cover 8 of the same construction as that of the bearings 4.

The lower run of the belting is carried by rollers of any suitable kind mounted on shafts that rotate in two supports similar to bearings 4. On the drawings these supports are shown as fixed, but they might equally well be pivoted on trunnions in the manner shown in connection with bearings 4.

The upper and lower runs of the belting are guided at intervals by rollers 16 and 18 having vertical axes. Rollers 16 which guide the upper run are formed with flanges 17 to prevent the inclined edge of the belt from sliding up along the rollers 16. The rollers 16 and 18 are each mounted on a fixed axle 19 bolted to the frame members 7. Each roller forms a grease box and is closed by a cap 20 held in place by a spring 21 screw threaded or otherwise secured to the roller.

From the foregoing it will be clear that all of the grease boxes are accessible, which greatly facilitates keeping the apparatus in order. It will also be evident that the lubrication of the shafts and the roller abutments is effected in a highly efficient manner.

What I claim is:

1. In a belt conveyer, a grease cup fixed to the stationary frame of the conveyer, an inclined shaft rotatably mounted in spaced bearings formed in the grease cup and projecting inwardly therefrom, a roller fixed on the projecting end of said shaft, and a collar removably secured to the shaft in the grease cup and bearing against one of said bearings to prevent endwise displacement of the shaft.

2. In a belt conveyer, a grease cup fixed to the stationary frame of the conveyer, a cover over said cup located above the belt and on the outside of said frame, whereby said cup may be filled or inspected without dismounting the same, an inclined shaft rotatably mounted in spaced bearings formed in said cup and projecting inwardly therefrom, a roller fixed on the projecting end of said shaft and a collar removably secured to the shaft in the cup and bearing against one of said bearings to prevent endwise displacement of said shaft.

In testimony whereof I hereunto affix my signature.

CHRISTIAN WOLF.